June 6, 1967  J. J. DI CESARE, JR., ETAL  3,323,262
Z-BAR FRAME ASSEMBLY
Filed Dec. 10, 1964  3 Sheets-Sheet 1

INVENTORS
John J. Di Cesare, Jr.
Jack A. Dawdy
BY
Pops and Sommer
ATTORNEYS

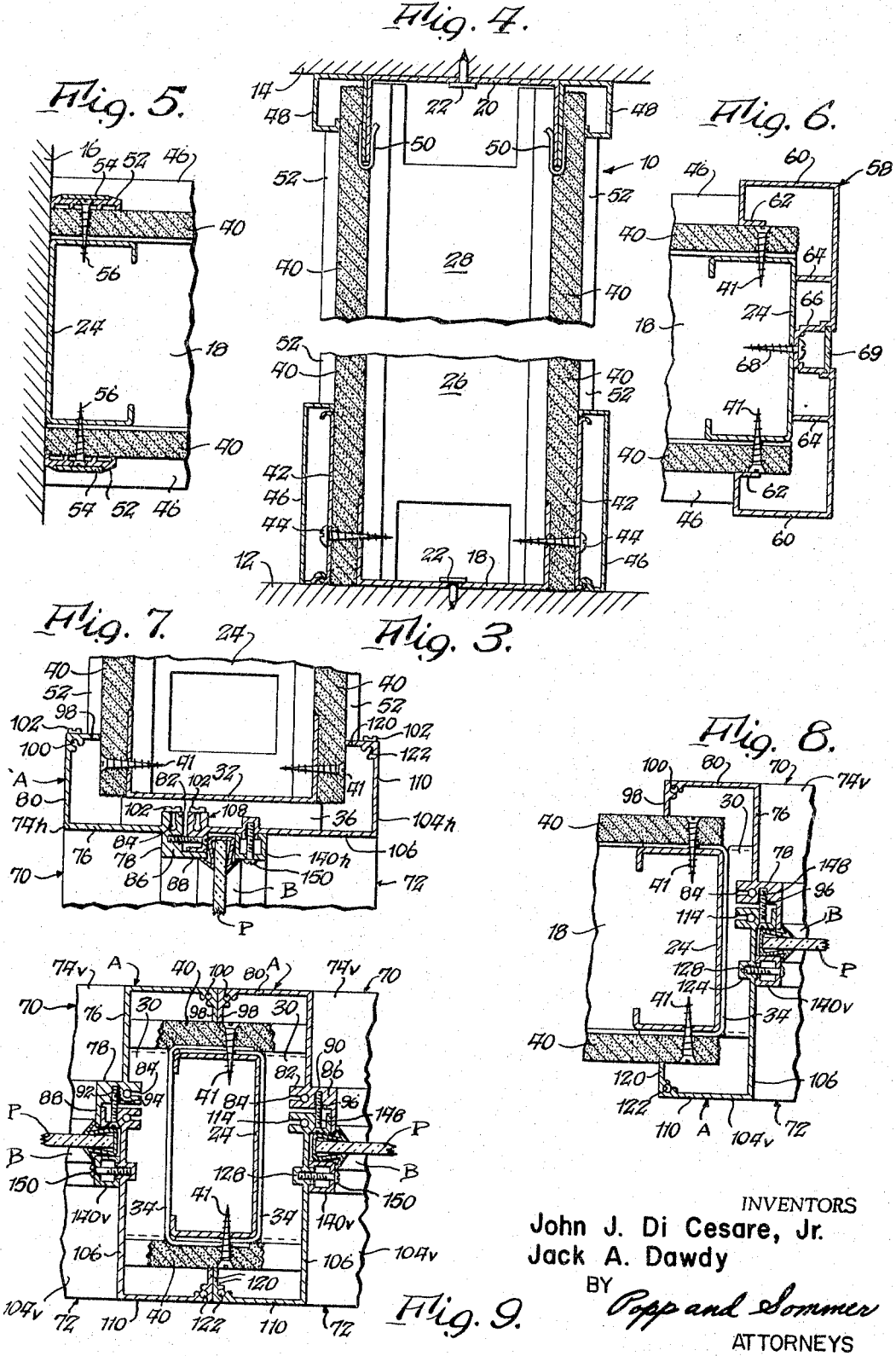

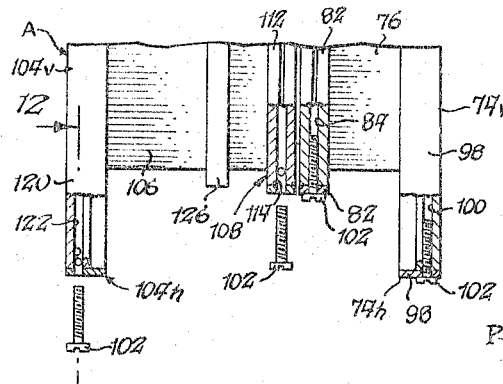
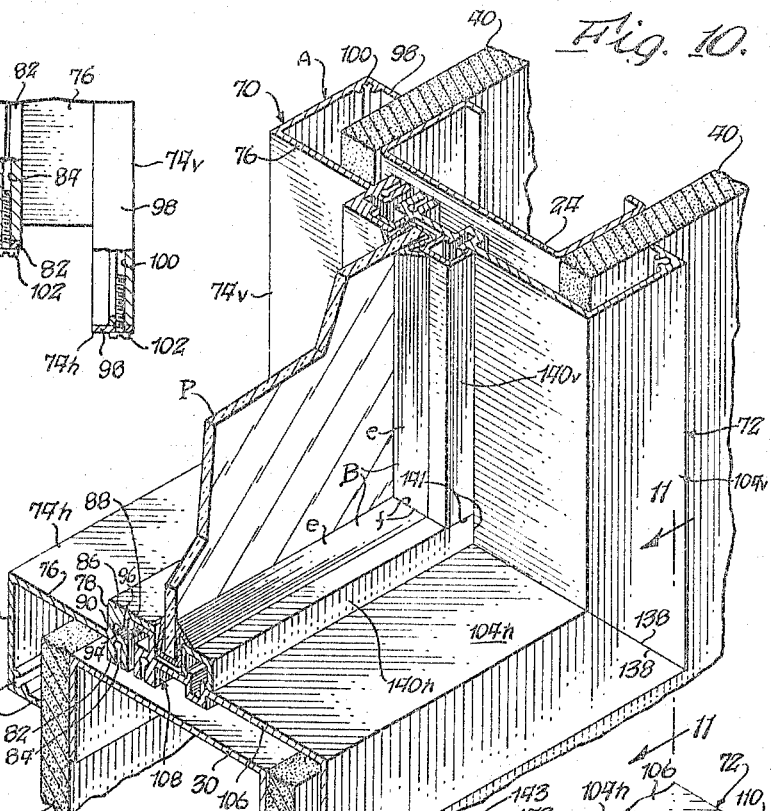
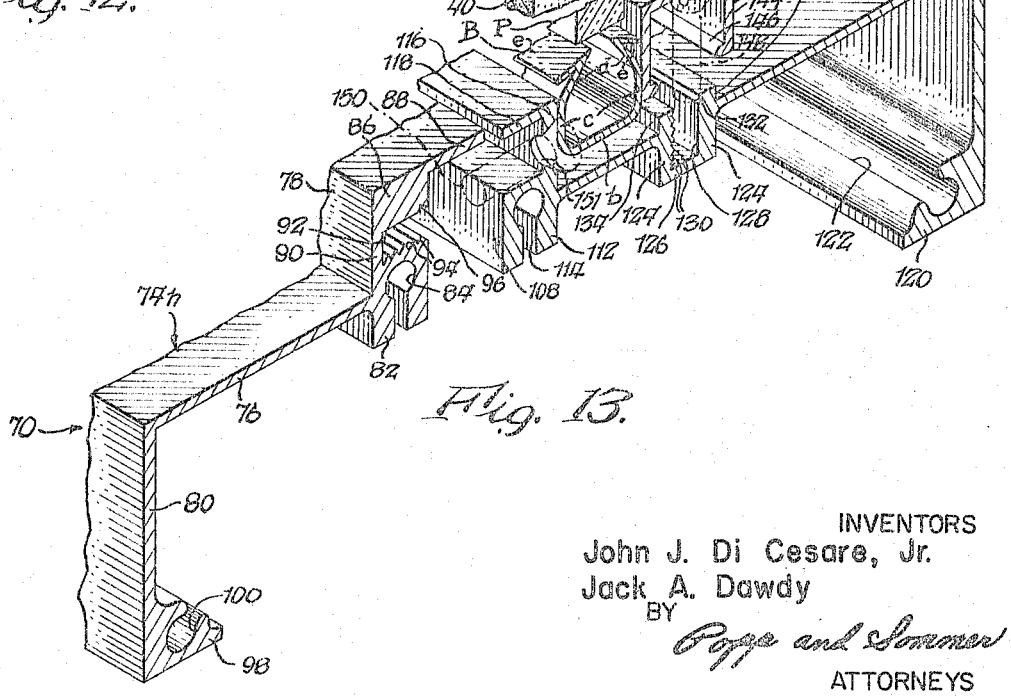

United States Patent Office 3,323,262
Patented June 6, 1967

3,323,262
Z-BAR FRAME ASSEMBLY
John J. Di Cesare, Jr., and Jack A. Dawdy, Kenmore,
N.Y., assignors to National Gypsum Company, Buffalo,
N.Y., a corporation of Delaware
Filed Dec. 10, 1964, Ser. No. 417,457
13 Claims. (Cl. 52—212)

This invention relates to improvements in wall construction, and more particularly to a new and improved frame assembly composed of Z bar frame components for removably supporting a wall panel, such as a glass panel, preferably in a demountable partition wall.

A primary object of the present invention is to provide such a frame assembly which is designed to permit installation of the glass panel following erection of the wall, as well as to facilitate installation of such panel by eliminating the necessity for inserting the panel into glazing recesses or channels in a wall frame.

Another object is to provide such a frame assembly which is designed to facilitate installation thereof by eliminating the use of mechanical fasteners for securing the assembly to the wall.

A further object is to provide such a frame assembly which is designed to permit temporary installation of ganged assemblies which are later easily plumbed and alined at the same time.

Another object is to provide such a frame assembly which is designed to minimize or eliminate visible fastening means for improved appearance.

A further object is to provide such a frame assembly which is composed of two complementary frames which are readily installed from opposite sides of the wall and readily fastened together, as well as readily unfastened and removed whenever desired.

Another object is to provide such a frame assembly wherein each of the two complementary frames is composed of Z bar components each preferably formed as a unitary member by extruding strong, light weight metal such as aluminum.

A further object is to provide such a frame assembly wherein one of the two complementary frames is composed of Z bar components which are adapted to support one side of the glass panel and to receive removable glazing stops for supporting the other side of the glass panel.

Another object is to provide such a frame assembly wherein the other of the two complementary frames is composed of Z bar components which are adapted to receive and at least partially conceal fasteners for removably securing the frames together.

A further object is to provide such a frame assembly wherein the Z bar components of each of the two complementary frames are adapted to receive and at least partially conceal the fasteners removably securing such components together.

Additional objects and advantages of the invention will become apparent upon consideration of the following detailed description when read in conjunction with the accompanying drawings, wherein:

FIG. 3 is an enlarged section taken on line 3—3 of FIG. 2 and illustrating the wall construction at the floor;

FIG. 4 is an enlarged section taken on line 4—4 of FIG. 2 and illustrating the wall construction at the ceiling;

FIG. 5 is an enlarged section taken on line 5—5 of FIG. 2 and illustrating the wall construction at the left end;

FIG. 6 is an enlarged section taken on line 6—6 of FIG. 2 and illustrating the wall construction at the right end;

FIG. 7 is an enlarged section taken on line 7—7 of FIG. 2 and illustrating the cross-sectional structure of the upper horizontal components of the left inventive frame assembly together with their relationships with the adjacent wall structure and the left glass panel;

FIG. 8 is an enlarged section taken on line 8—8 of FIG. 2 and illustrating the cross-sectional structure of the left vertical components of the left inventive frame assembly, together with their relationships with the adjacent wall structure and the left glass panel;

FIG. 9 is an enlarged section taken on line 9—9 of FIG. 2, and illustrating the cross-sectional structure of the adjacent vertical components of the two ganged inventive frame assemblies, together with their relationships with each other, the adjacent wall structure and both glass panels;

FIG. 10 is a further enlarged partial perspective view of the lower right corner of the right inventive frame assembly of FIG. 2, and illustrating the cross-sectional structure of the lower horizontal and right vertical frame components of such assembly, together with their relationships with each other, the adjacent wall structure and the right glass panel;

FIG. 11 is a partial section taken on line 11—11 of FIG. 10, with the wall structure removed, and illustrating how the horizontal and vertical frame components of FIG. 10 are secured together;

FIG. 12 is an enlarged partial section taken on line 12—12 of FIG. 11 and illustrating in greater detail how the outer flanges of the horizontal and vertical frame components of FIGS. 10 and 11 are secured together, and FIG. 13 is a further enlarged exploded partial perspective view of the lower front end portions of the horizontal frame components of FIG. 10, with the adjacent wall structure removed, and illustrating in still greater detail the cross-sectional structure of such components, their relationships with each other, the right glass panel and the separate lower horizontal glazing stop adjacent the panel.

Figure 1:
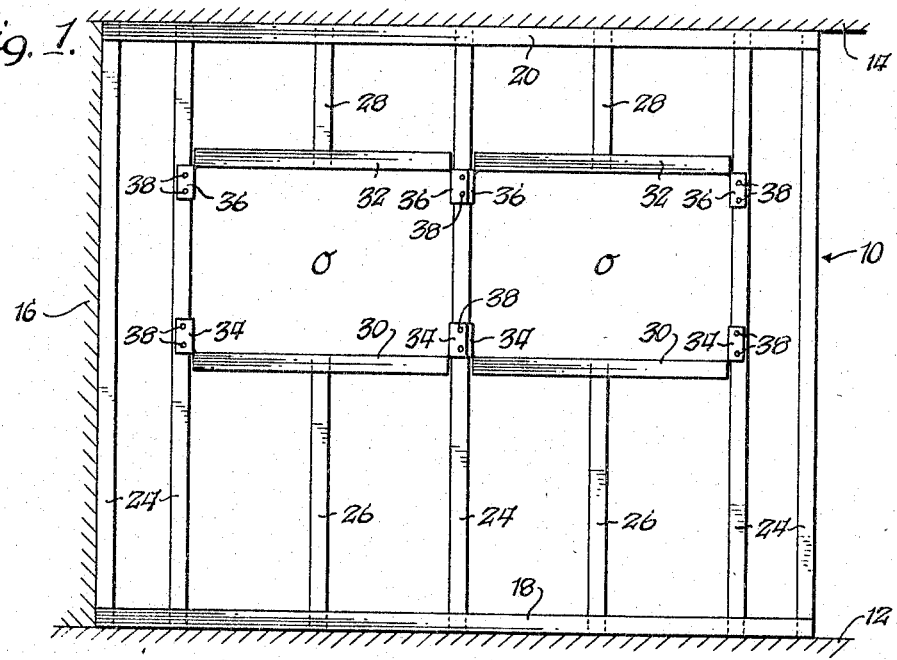
FIG. 1 is a vertical elevational view of one side of a partially completed, ceiling height demountable partition wall, and illustrating the various wall framing members including those defining two ganged window openings.
Figure 2:
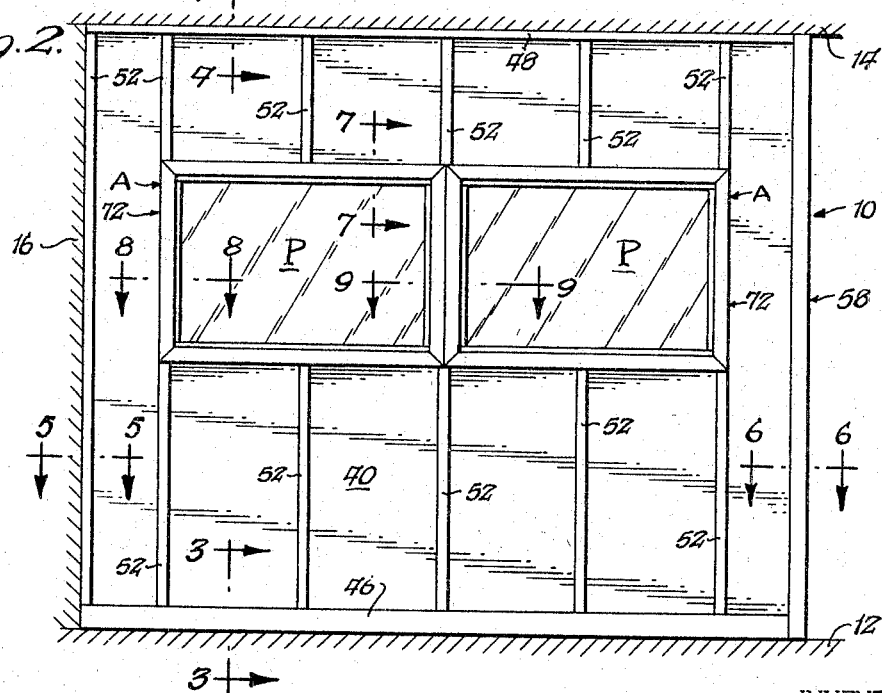
FIG. 2 is a view similar to FIG. 1, but illustrating the completed wall together with two glass panels, and two ganged frame assemblies each constituting a preferred embodiment of the invention.

Referring to the drawings, wherein like numerals indicate like parts unless otherwise specified, and particularly FIGS. 1 and 2, a ceiling height, demountable partition wall is generally indicated at 10. This wall fills the space between the floor 12, ceiling 14 and left end wall 16 of a building, the right end of partition wall 10 forming part of an internal opening such as a passageway, walk through or the like.

As best seen in FIG. 1, the basic or skeleton structure of wall 10 is made up of various horizontal and vertical hollow metal frame members including a channel shaped floor track 18 (FIG. 3) and a channel shaped ceiling track 20 (FIG. 4), each secured in place by suitable stub nails 22. Supported within one or both of the tracks are a plurality of vertical hollow metal studs of generally channel shape, the longest studs being indicated at 24, the shorter lower studs at 26, and the shortest upper studs at 28. These studs are secured in place in any suitable manner, such as by clinching or metal screws, not shown. The framing members are completed by shorter lower and upper horizontal tracks 30 and 32 respectively, tracks 30 having their cut end portions bent upwardly over adjacent studs 24, and tracks 32 having their cut end portions 36 bent downwardly over adjacent studs 24, with the adjacent end portions 34 and 36 overlapping each other on central stud 24. Once again, tracks 30 and 32 may be secured in place in any suitable manner, such as by clinching, not shown, or by screws 38, shown on studs 24.

Referring now to FIG. 2, the completed partition wall 10 is shown therein, the various studs and tracks being covered by one or more suitable wall panels forming the panelling generally indicated at 40, and illustrated schematically as gypsum wall board. This panelling 40 is suitably secured in place, such as by screws 41 (FIGS. 6–9). In order to cover such screws and any joints in the panelling, wall 10 is also provided with various trim components.

As shown in FIG. 3, the lower ends of wall 10 are covered by a base trim composed of a metal base clip 42 held in place by screws 44 and completed by a metal snap on base 46. Referring to FIG. 4, the upper ends of wall 10 are covered by hollow J-shaped ceiling trim channels having their inner flanges abutting the flanges of ceiling track 18 and removably secured thereto by spring clip 50. As will be evident, the ceiling trim is installed prior to panelling 40.

Continuing with FIGS. 2 and 5, the panelling screws and vertical joints are covered by metal battens 52 each having a dove-tailed recess for retaining a decorative flexible plastic insert strip 54 covering screws 56 securing the battens in place. The various battens 52 are merely schematically shown in FIG. 2 for clarity.

The right or exposed end of wall 10 is covered by an extruded metal cornice and rail cap 58, as shown in FIG. 6. This cap is of generally channel-shaped cross-section, has its open end fitting over the right end of wall 10, and includes inturned outer flange portions 60 terminating in reentrant distal flange portions 62, as well as internal lateral flange portions 64 spaced on each side of a central stepped recess portion 66. The flange portions 62 abut the outer sides of panelling 40 while flange portions 64 on the base of recess portion 66 abut the base of adjacent stud 24 to ensure a snug fit, and the cap 58 is rigidly but removably secured in place by screws 68 passing through the bases of recess 66 and stud 24. These screws are effectively concealed by a flexible plastic strip 69 inserted in grooves provided in the side walls of recess portion 66.

Referring momentarily to FIG. 1, it will be noted that the various studs 24, 26 and tracks 30, 32 cooperate to form two ganged rectangular window openings O. As shown in FIG. 2, these openings are closed by the ganged rectangular glass panels P, which are removably secured in place by the ganged inventive frame assemblies generally indicated at A, and as will become more evident below, the design of frame assemblies A permits installation of panels P after completion of wall 10, as well as after installation of the frame assemblies, while facilitating installation of panels P by eliminating the need for inserting the panels P into glazing recesses or channels in a window frame.

However, prior to describing the inventive frame assembly A, it will be noted from FIGS. 7–10 and particularly FIG. 13, that the edge portions of panels P are covered and protected by glazing beads B, each preferably extruded to shape from suitable plastic material such as rigid polyvinyl chloride, and cut to length. Each bead B is composed of a flat base portion b having inner converging leg portions c merging with more steeply converging outer leg portions d terminating in reversely bent and oppositely diverging wing portions e. Normally the distance between inner leg portions d is less than the thickness of panel P, but these leg portions can be readily sprung apart to snap or slide bead B in place over the adjacent edge portion of panel P. Each bead B is also preferably provided with bevelled ends f (FIG. 10) to form a continuous bead frame for improved appearance.

Continuing with FIGS. 7–10, and particularly FIG. 13, the inventive frame assembly is primarily composed of two rectangular frames 70 and 72, each made up of two horizontal and two vertical Z bar components removably fastened together. Since the Z bar components in each frame are the same except that the horizontal components are longer than the vertical components (FIG. 2), a description of one will suffice for the others.

Referring specifically to FIG. 13, the lower horizontal Z bar component 74h of frame 70 is composed of a web 76 connecting and perpendicular to oppositely extending inner and outer flanges 78 and 80 respectively. The upstanding inner flange 78 includes an enlarged inner or lower portion 82, which extends a short distance on both sides of web 76 and is provided with a longitudinal through key-hole slot 84 opening away from the under or lower side of web 76 and generally parallel to flange 80. Flange 78 also includes an enlarged outer portion 86 terminating in a longitudinal ledge portion 88 extending laterally outwardly beyond the outer surface of flange 78, and which outer surface is remote from web 76. The inner and outer portions 82 and 86 respectively are connected by the bottom wall 90 of a longitudinal through channel 92 opening laterally outwardly in the outer surface of flange 78 between the inner and outer portions, and the adjacent surfaces of these inner and outer portions form the opposed longitudinally serrated inner surfaces of channel 92. The lower of these two inner surfaces is covered by a plurality of longitudinal serrations 94, while the upper surface is provided with just one starter serration 96 adjacent its outer end. This serrated structure is sufficient to ensure proper tightening of the frame assembly fasteners to be described.

The depending outer flange 80 completes Z bar component 74h and has an enlarged distal portion 98 extending laterally inwardly from the inner side of flange 80, and which inner side is adjacent web 76. Distil portion 98 is provided with a through longitudinal groove 100 of greater than semi-cylindrical cross-section and opening at an angle toward the under side of web 76.

Although not visible, the horizontal and vertical components 74h and 74v, of frame 70 are provided with bevelled ends or edges and are arranged perpendicular to each other end to end, with the corresponding ones of flanges 78, 80, ledge portions 88, channels 92, grooves 100 and slots 84 in perpendicular alinement. Likewise, when assembled with frame 72, the distal portions 98 engage the adjacent side of wall 10 (FIG. 10), with no wall fasteners needed.

As best seen in the right half of FIG. 11, the components 74h and 74v are removably secured together by screws 102 passing laterally through holes in distal portions 98 and grooves 100 as well as through holes in inner portions 82 and slots 84 at the ends of horizontal components 74h and extending longitudinally into threaded engagement with the corresponding grooves 100 and slots 84 respectively in vertical components 74v, the screws 102 making their own threads in grooves 100 and slots 84. As will be evident, all except the heads of screws 102 are concealed by this cooperating structure, and even the heads are normally out of view because they are either under the lower horizontal components or over the upper horizontal components. As will also be evident, frames 70 may be readily assembled and stored for later use.

Referring back to FIGS. 10 and 13, the frames 72 will now be described primarily by reference to the lower horizontal Z bar component 104h of FIG. 13. Component 104h is composed of a wider web 106 connecting and perpendicular to oppositely extending inner and outer flanges 108 and 110 respectively. Upstanding inner flange 108 includes an enlarged inner portion 112 extending a short distance on both sides of web 106 and provided with a like longitudinal through key-hole shaped slot 114 opening away from the underside of web 106 and generally parallel to flange 110. Flange 108 also includes an outstanding connecting portion 116 terminating in a longitudinal outer shelf portion 118 extending laterally outwardly from the outer side of outer flange portion 116 remote from web 106 and forming with inner portion 112 the outermost surface of flange 108. The opposite inner surface of flange 108 extends laterally beyond the outer side of web 106 and forms a surface for supporting the inside of beaded panel P, as will be presently seen.

The depending outer flange 110 has a like enlarged distal portion 120 extending laterally inwardly from its inner side adjacent web 106. Distal portion 120 is provided with a like longitudinal through groove 122 of greater than semi-cylindrical cross-section and opening at an angle toward the under side of web 106.

Web 106 is provided adjacent flange 108 with means forming the recessed side walls 124 and bottom wall 126 of a longitudinal through channel 128 opening laterally outwardly in the outer or upper side of web 106. Side walls 124 form the opposed longitudinally serrated inner surfaces of channel 128. The inner one of these two surfaces is covered by a plurality of longitudinal serrations 130, while the other surface is provided with just one starter serration 132 adjacent its outer end. As in channel 92, this serrated structure is sufficient to ensure proper tightening of the glazing stop fasteners to be described. Side walls 124 also extend beyond the outer or upper side of web 106 to form the two oppositely facing outer surfaces 134, 136 of channel 128 for engagement with the glazing stop to be described below.

As is evident from FIGS. 2 and 10, the horizontal and vertical components 104h and 104v of frame 72 are provided with bevelled ends or edges 138 and are arranged perpendicular to each other end to end, with the corresponding ones of flanges 108, 110, shelf portions 118, channels 128, grooves 122 and slots 114 in perpendicular alinement. Likewise, when assembled with frame 70, the distal portions 120 engage the adjacent side of wall 10.

As best seen in FIGS. 11 and 12, the components 104h and 104v are removably secured together by the aforesaid screws 102 passing laterally through holes in distal portions 120 and grooves 122 as well as through holes in inner portions 112 and slots 114 at the ends of horizontal components 104h and extending longitudinally into threaded engagement with the corresponding grooves 122 and slots 114 in vertical components 104v, the screws making their own threads in grooves 122 and slots 114. Once again, as with frame 70, all but the heads of screws 102 are concealed by this cooperating structure, and even the screw heads are not normally visible because they are under and over the lower and upper horizontal components 104h respectively. Likewise, frames 72 may be prefabricated and stored for later use.

Frame 72 is completed by a sub-frame composed of glazing stops 140h and 140v and each is provided with squared ends or edges, with the ends of 140h notched to fit over the protruding side walls 124 for ease of assembly. Each generally channel-shaped stop 140h or 140v is like that shown in FIG. 8 of the copending application of John J. Di Cesare, Jr. and Edward J. Rutkowski, Ser. No. 414,060, filed Nov. 27, 1964. Each stop is essentially composed of a base portion 142 provided with countersunk through openings 143 and a pair of outstanding lateral flange portions 144 terminating in inturned distal lug portions 146 having rounded ends or edges for sliding engagement with outer surfaces 134, 136 of channel 128. The stops 140h or 140v are removably secured in place by screws 148 which extend laterally through openings 143 and into threaded engagement with the serrated inner surfaces of channel 128.

As will be evident from FIGS. 10 and 13, the outer surface of the inner stop flange portion 144 faces the inner surface of component flange 108 and supports the outer side of beaded panel P. Likewise, this cooperating channel and stop structure effectively conceals all of screws 148 except their heads, and only the upper surfaces thereof are visible because of counter sunk holes 143.

The inventive frame assembly A is completed by the screws 150 (FIG. 13) which pass laterally through similarly countersunk holes 151 through outstanding portions 116 between inner portions 112 and outer portions 118 of flanges 108 and into threaded engagement with the serrated inner surfaces of channels 92, for removably securing the Z bar components of frames 70 and 72 together. As will be evident from FIGS. 10 and 13, these frames are arranged so that the various components 74h and 74v correspond with components 104h and 104v respectively, with ledge portions 88 overlying shelf portions 118, flanges 78 and 108 having their outer surfaces facing each other, and flanges 80 and 110 extending in the same direction, with their distal portions 98 and 120 respectively facing each other and compressively engaging the opposite sides of wall 10 around openings O (FIG. 1). Thus, the ganged assemblies A (FIG. 2) can be temporarily installed after erection of wall 10, and then plumbed and alined at the same time for rigid securement, with no need for otherwise fastening the same to wall 10, because of the adjustable screws 150, which are effectively hidden by the cooperating flange structure of the frames and beads B (FIG. 13).

Likewise, it is evident that frames 70 and 72 can be readily assembled together from opposite sides of the finished wall 10, following which the glass panels P can be readily installed and secured in place by fastening stops 140h and 14v with screws 148. There is no need for inserting the panels into a plurality glazing recesses or channels because they may be merely set against the inner surfaces of flanges 108, there being sufficient clearance for passing over the portions of side walls 124 which protrude beyond the outer sides of webs 106. Moreover, although the various Z bar components and stops of the inventive frame assembly may be made of any suitable material, it is preferred that they be extruded in one piece from strong, light weight metal such as aluminum for optimum strength to weight ratio.

It will now be seen how the invention accomplishes its objects, and the various advantages of the invention will also be apparent. While the invention has been described and illustrated herein by reference to a preferred embodiment, it is to be understood that various changes and modifications may be made therein by those skilled in the art without departing from the inventive concept, the scope of which is to be determined by the appended claims.

What is claimed is:

1. A frame assembly section for removably supporting a wall panel, such as a glass panel, and comprising in combination, first and second Z bar frame components and means removably fastening said components together, said first component comprising a first web connecting first oppositely extending inner and outer flanges, said first inner flange including an inner portion provided with a longitudinal slot and an outer portion connected to said inner portion by the bottom wall of a first longitudinal channel opening laterally outwardly in the outer surface of said first inner flange remote from said first web, said inner and outer portions having means forming the opposed inner surfaces of said first channel and said first outer flange having a distal portion provided with a longitudinal groove, said second component comprising a second web connecting second oppositely extending inner and outer flanges, said second inner flange including an inner portion provided with a longitudinal slot, an outer portion and means forming a lateral through opening between said second inner and outer portions, said second outer flange having a distal portion provided with a longitudinal groove, said second web having means forming the side walls and bottom wall of a second longitudinal channel opening laterally outwardly in the outer side of said second web remote from said second outer flange, said first and second components being arranged with said first and second outer flanges extending in the same general direction and with said first and second inner flanges having their outer surfaces facing each other, and said fastening means extending laterally through said opening in said second inner flange into engagement with said inner surfaces of said first channel.

2. The section of claim 1 wherein said inner and outer portions of said first inner flange have means forming the opposed longitudinally serrated inner surfaces of said first channel, one of said first and second inner flanges terminates in a longitudinal ledge portion extending laterally beyond the outer surface of said one of said first and second inner flanges, said side walls have means forming the opposed longitudinally serrated inner surfaces of said second channel and extend laterally beyond said outer side of said second web to form oppositely facing outer surfaces of said second channel, said first and second components are arranged with said ledge portion overlying said outer portion of the other of said first and second inner flanges, and said fastening means comprise at least one threaded fastener extending laterally through said opening in said second inner flange and into threaded engagement with said serrated inner surfaces of said first channel.

3. In combination with the section of claim 2, a glazing stop of generally channel shape including a base portion and a pair of inner and outer outstanding flange portions having means engaging said oppositely facing outer surfaces of said second channel, said inner outstanding flange portion having an outer surface facing said second inner flange for supporting one side of said panel, and said second inner flange having an inner surface extending laterally beyond said outer surface of said second web and facing said outer surface of said inner outstanding flange portion for supporting the other side of said panel.

4. The combination of claim 3 including at least one threaded fastener extending laterally through said base portion of said stop and into threaded engagement with said serrated inner surfaces of said second channel for removably securing said stop on said second component.

5. A frame for removably supporting a wall panel, such as a glass panel, and comprising a plurality of Z bar frame components and means removably fastening said components together, each of said components comprising a web connecting oppositely extending flanges, one of said flanges including an enlarged inner portion provided with a longitudinal slot opening away from one side of said web and an outer longitudinal shelf portion extending laterally outwardly from the side of said one flange remote from said web and connected to said inner portion by an outstanding portion having means forming a lateral through opening between said inner and outer portions, the other of said flanges having an enlarged distal portion extending laterally inwardly from the side of said other flange adjacent said web and provided with a longitudinal groove opening toward said one side of said web, and said web having means forming the side walls and bottom wall of a longitudinal channel opening laterally outwardly in the other side of said web, said side walls having means forming the opposed longitudinally serrated inner surfaces of said channel and extending laterally beyond said other side of said web to form oppositely facing outer surfaces of said channel, said components having bevelled ends and being arranged end to end with the corresponding ones of said flanges, shelf portions, channels, grooves and slots in angular alinement, and said fastening means including a plurality of threaded fasteners severally extending laterally through some of said grooves and slots and longitudinally into threaded engagement with others of said grooves and slots.

6. In combination with the frame of claim 5, a plurality of glazing stops each of generally channel shape including a base portion and a pair of outstanding flange portions having means engageable with said oppositely facing outer surfaces of each of said channels, one of said outstanding flange portions of each of said stops having an outer surface for supporting one side of said panel, and said one flange of each of said components having an inner surface extending laterally beyond said other side of each of said webs and facing said outer surface of said one outstanding flange portion for supporting the other side of said panel, said stops being arranged to form a sub-frame within said frame and with the corresponding ones of said base portions and outstanding flange portions in angular alinement.

7. The combination of claim 6 including threaded fastening means extending laterally through said base portion of each of said stops and into threaded engagement with said serrated inner surfaces of each of said channels for removably securing each of said stops on each of said components, and wherein said stops have squared ends and are arranged with ends overlapping to form said sub-frame.

8. In wall construction including a wall having an opening, and a wall panel, such as a glass panel, adapted to be arranged in said opening, the combination therewith of a frame assembly for removably supporting said panel in said wall opening, said frame assembly comprising first and second frames arranged on opposite sides of said wall and means removably fastening said frames together, said first frame comprising a plurality of first Z bar frame components and first means removably fastening said first components together, each of said first components comprising a first web connecting first oppositely extending inner and outer flanges, said first inner flange including an enlarged inner portion provided with a first longitudinal slot opening away from the under side of said first web, and an enlarged outer portion terminating in a longitudinal ledge portion extending laterally outwardly beyond the outer surface of said first inner flange remote from said first web, said inner and outer portions being connected by the bottom wall of a first longitudinal channel opening laterally outwardly in said outer surface, and said inner and outer portions having means forming the opposed longitudinally serrated inner surfaces of said first channel, and said first outer flange having an enlarged distal portion extending laterally inwardly from the inner side of said first outer flange adjacent said first web and provided with a longitudinal groove opening toward said under side of said first web, said first components having bevelled edges and being arranged end to end with the corresponding ones of said first inner and outer flanges, ledge portions, channels, grooves and slots in angular alinement and with said distal portions of said first outer flanges engaging one side of said wall around said opening, and said first component fastening means including a plurality of first threaded fasteners severally extending laterally through some of said first grooves and slots and longitudinally into threaded engagement with others of said first grooves and slots.

9. The combination of claim 8 wherein said second frame comprises a plurality of second Z bar components, second means removably fastening said second components together, a plurality of glazing stops and third means removably fastening said stops on said second components, each of said second components comprising a second web connecting second inner and outer flanges together, said second inner flange including an enlarged inner portion provided with a second longitudinal slot opening away from the under side of said second web, and an outer longitudinal shelf portion extending laterally outwardly from the outer side of said second inner flange remote from said second web, and connected to said inner portion by an outstanding portion having means forming a lateral through opening between said inner and outer portions, said second outer flange having an enlarged distal portion extending laterally inwardly from the inner side of said second outer flange adjacent said web and provided with a second longitudinal groove opening toward said under side of said second web, and said second web having means forming the side walls and bottom wall of a second longitudinal channel opening laterally outwardly in said outer side of said second web, said side walls having means forming the opposed longitudinally serrated inner surfaces of said second channel and extending laterally outwardly beyond said outer surface of said second web to form oppositely facing outer surfaces of said second channel, said second components having bevelled edges and being arranged end to end with corresponding ones of said second inner and outer flanges, shelf portions, channels, grooves and slots in angular alinement and with said distal portions of said second outer flanges engaging the other side of said wall around said opening, said second component fastening means including a plurality of second threaded fasteners severally extending laterally through some of said second grooves and slots and longitudinally into threaded engagement with others of said second grooves and slots.

10. The combination of claim 9 wherein each of said glazing stops is of generally channel shape including a base portion and a pair of outstanding flange portions engaging said oppositely facing outer surfaces of each of said second channels, the inner one of said outstanding flange portions of each of said stops having an outer surface supporting one side of said panel, said second inner flange of each of said second components having an inner surface extending laterally beyond said outer side of each of said second webs, facing said outer surface of each of said inner outstanding flange portions and supporting the other side of said panel, said stops having squared ends and being arranged with ends overlapping with the corresponding ones of said base portions and outstanding flange portions in angular alinement to form a sub-frame within said second frame, and said third fastening means include a plurality of third threaded fasteners severally extending laterally through said base portions and into threaded engagement with said serrated inner surfaces of said second channels for removably securing said stops on said second components.

11. The combination of claim 10 wherein said first and second frames are arranged so that said first and second components correspond, with said ledge portions overlying the corresponding ones of said shelf portions, the corresponding ones of said first and second inner flanges have their outer surfaces facing each other, and the corresponding ones of said first and second outer flanges extending in the same direction with their distal portions facing each other, and wherein said frame fastening means comprises a plurality of threaded fasteners severally extending laterally through said openings in said outstanding portions of said inner flanges and into threaded engagement with said serrated inner surfaces of said first channels for removably securing said first and second frames together.

12. A frame assembly section for removably supporting a wall panel, such as a glass panel, and comprising in combination, first and second Z-bar frame components and means removably fastening said components together, each of said components comprising a web connecting oppositely extending inner and outer flanges, each of said inner flanges including an inner portion provided with a longitudinal slot, an outer portion and means forming a lateral opening between said inner and outer portions, one of said openings extending through one of said inner flanges and the other of said openings extending into the other of said inner flanges from the outer surface thereof remote from its web, each of said outer flanges having a distal portion provided with a longitudinal groove, one of said webs having means forming the side walls and bottom walls of a longitudinal channel opening laterally outwardly in the outer side of said one web remote from its outer flange, said first and second components being arranged with the first and second ones of said outer flanges extending in the same general direction and with the first and second ones of said inner flanges having their outer surfaces facing each other, and said fastening means extending laterally through said opening in said one of said inner flanges and into engagement with said means forming said opening in said other of said inner flanges.

13. In wall construction including a wall having an opening, and a wall panel, such as a glass panel, adapted to be arranged in said opening, the combination therewith of a frame assembly for removably supporting said panel in said opening, said frame assembly comprising first and second frames arranged on opposite sides of said wall and means removably fastening said frames together, said first and second frames comprising a plurality of first and second Z-bar frame components respectively, and means removably fastening said components together, each of said components comprising a web connecting oppositely extending inner and outer flanges, each of said inner flanges including an inner portion provided with a longitudinal slot, an outer portion and means forming a lateral opening between said inner and outer portions, one of said openings extending through one of said inner flanges and the other of said openings extending into the other of said inner flanges from the outer surface thereof remote from its web, each of said outer flanges having a distal portion provided with a longitudinal groove, each of said webs of one of said frames having means forming the side walls and bottom walls of a longitudinal channel opening laterally outwardly in its outer side remote from its outer flange, said first and second components being arranged end to end with corresponding ones of said first and second components respectively to form said first and second frames respectively, with the corresponding ones of said inner and outer flanges, channel, grooves and slots in angular alinement and with said distal portions engaging the adjacent sides of said wall around said opening, said component fastening means including a plurality of threaded fasteners severally extending laterally through some of said grooves and slots and longitudinally into threaded engagement with others of said grooves and slots in each of said frames, said first and second components being arranged with the corresponding first and second ones of said outer flanges extending in the same general direction and with the corresponding first and second ones of said inner flanges having their outer surfaces facing each other, and said frame fastening means including a plurality of threaded fasteners severally extending laterally through said openings in said inner flanges of one of said frames and into threaded engagement with said means forming said openings in said inner flanges of the other of said frames.

References Cited
UNITED STATES PATENTS

| | | | |
|---|---|---|---|
| 2,804,954 | 9/1957 | Gillespie | 52—213 |
| 3,176,806 | 4/1965 | Ferrell | 52—213 |
| 3,208,564 | 9/1965 | Sitterly | 189—75 X |

DAVID J. WILLIAMOWSKY, *Primary Examiner.*

KENNETH DOWNEY, HARRISON R. MOSELEY,
*Examiners.*